(12) United States Patent
Drazic et al.

(10) Patent No.: US 7,175,279 B2
(45) Date of Patent: Feb. 13, 2007

(54) TWO-STAGE PROJECTION ARCHITECTURE

(75) Inventors: Valter Drazic, Betton (FR); Khaled Sarayeddine, Nouvoitou (FR); Estill Thone Hall, Fishers, IN (US); Eugene Murphy O'Donnell, Fishers, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 62 days.

(21) Appl. No.: 10/537,112

(22) PCT Filed: Nov. 26, 2003

(86) PCT No.: PCT/US03/38011

§ 371 (c)(1),
(2), (4) Date: Jun. 2, 2005

(87) PCT Pub. No.: WO2004/051995

PCT Pub. Date: Jun. 17, 2004

(65) Prior Publication Data

US 2006/0119796 A1 Jun. 8, 2006

Related U.S. Application Data

(60) Provisional application No. 60/430,996, filed on Dec. 4, 2002.

(51) Int. Cl.
G03B 21/14 (2006.01)
(52) U.S. Cl. .............................. 353/31; 353/94; 353/37; 349/5; 348/758
(58) Field of Classification Search ................. 353/31, 353/33, 34, 37, 20, 94; 349/5, 7, 8, 9; 348/742, 348/743, 744, 758
See application file for complete search history.

(56) References Cited

U.S. PATENT DOCUMENTS

| 5,978,142 A | * | 11/1999 | Blackham et al. .......... 359/618 |
| 6,304,302 B1 | | 10/2001 | Huang et al. |
| 6,406,148 B1 | * | 6/2002 | Marshall et al. .............. 353/31 |

(Continued)

FOREIGN PATENT DOCUMENTS

WO  WO01/69941  9/2001

(Continued)

OTHER PUBLICATIONS

Search Report Dated Jun. 8, 2004.

*Primary Examiner*—William C. Dowling
(74) *Attorney, Agent, or Firm*—Joseph J. Laks; Harvey D. Fried; Patricia Verlangieri

(57) ABSTRACT

A two-stage light projection system is provided for projecting an image comprising a matrix of light pixels having modulated luminance. A first imager is configured to modulate a light band on a pixel-by-pixel basis proportional to gray scale values provided for each pixel of the image to provide a first output matrix. A second imager is positioned and configured to receive the first output matrix and modulate the individual modulated pixels of light from the first imager on a pixel-by-pixel basis proportional to a second gray scale value provided for each pixel. A relay lens system having a single-gauss lens set and a mirror positioned at the system stop focuses the modulated light output from the first imager on a pixel-by-pixel basis onto the corresponding pixels of the second imager.

17 Claims, 5 Drawing Sheets

U.S. PATENT DOCUMENTS

| | | |
|---|---|---|
| 6,561,557 B2 | 5/2003 | Choi |
| 6,561,652 B1 | 5/2003 | Kwok et al. |
| 6,637,888 B1 | 10/2003 | Haven |
| 6,643,069 B2 * | 11/2003 | Dewald ................ 359/629 |
| 7,002,533 B2 * | 2/2006 | Sayag ..................... 345/7 |
| 2003/0103171 A1 | 6/2003 | Hall, Jr. et al. |
| 2005/0174495 A1 * | 8/2005 | Itoh et al. ................ 348/758 |

FOREIGN PATENT DOCUMENTS

| | | |
|---|---|---|
| WO | WO02/03687 | 1/2002 |
| WO | WO02/069030 | 9/2002 |

* cited by examiner

FIELD CURVATURE / DISTORTION

POLYCHROMATIC DIFFRACTION MTF

TWO-STAGE PROJECTION ARCHITECTURE

CROSS-REFERENCE TO RELATED APPLICATIONS

This application claims the benefit, under 35 U.S.C. § 365 of International Application PCT/US03/38011, filed Nov. 26, 2003, which was published in accordance with PCT Article 21 (2) on Jun. 17, 2004 in English and which claims the benefit of U.S. provisional patent application No. 60/430,996, filed Dec. 4, 2002.

FIELD OF THE INVENTION

The invention is related generally to a light projection system, and more particularly to a two-stage projection architecture.

BACKGROUND

Liquid crystal displays (LCDs), and particularly liquid crystal on silicon (LCOS) systems using a reflective light engine or imager, are becoming increasingly prevalent in imaging devices such as rear projection television (RPTV). In an LCOS system, projected light is polarized by a polarizing beam splitter (PBS) and directed onto a LCOS imager or light engine comprising a matrix of pixels. Throughout this specification, and consistent with the practice of the relevant art, the term pixel is used to designate a small area or dot of an image, the corresponding portion of a light transmission, and the portion of an imager producing that light transmission.

Each pixel of the imager modulates the light incident on it according to a gray-scale factor input to the imager or light engine to form a matrix of discrete modulated light signals or pixels. The matrix of modulated light signals is reflected or output from the imager and directed to a system of projection lenses which project the modulated light onto a display screen, combining the pixels of light to form a viewable image. In this system, the gray-scale variation from pixel to pixel is limited by the number of bits used to process the image signal. The contrast ratio from bright state (i.e., maximum light) to dark state (minimum light) is limited by the leakage of light in the imager.

One of the major disadvantages of existing LCOS systems is the difficulty in reducing the amount of light in the dark state, and the resulting difficulty in providing outstanding contrast ratios. This is, in part, due to the leakage of light, inherent in LCOS systems.

In addition, since the input is a fixed number of bits (e.g., 8, 10, etc.), which must describe the full scale of light, there tend to be very few bits available to describe subtle differences in darker areas of the picture. This can lead to contouring artifacts.

One approach to enhance contrast in LCOS in the dark state is to use a COLORSWITCH™ or similar device to scale the entire picture based upon the maximum value in that particular frame. This improves some pictures, but does little for pictures that contain high and low light levels. Other attempts to solve the problem have been directed to making better imagers, etc. but these are at best incremental improvements.

What is needed is a projection system that enhances the contrast ratio for video images, particularly in the dark state, and reduces contouring artifacts.

SUMMARY

The present invention provides a projection system that provides improved contrast and contouring of a light signal on a pixel-by-pixel basis using a two-stage projection architecture, thus improving all video pictures. A first imager is configured to modulate a light band on a pixel-by-pixel basis proportional to gray scale values provided for each pixel of the image to provide a first output matrix. A second imager is positioned and configured to receive the first output matrix and modulate the individual modulated pixels of light from the first imager on a pixel-by-pixel basis proportional to a second gray scale value provided for each pixel. A relay lens system having a single-gauss lens set and a mirror positioned at the system stop focuses the modulated light output from the first imager on a pixel-by-pixel basis onto the corresponding pixels of the second imager.

BRIEF DESCRIPTION OF THE DRAWINGS

The invention will now be described with reference to accompanying figures of which.

DETAILED DESCRIPTION

Figure 1:
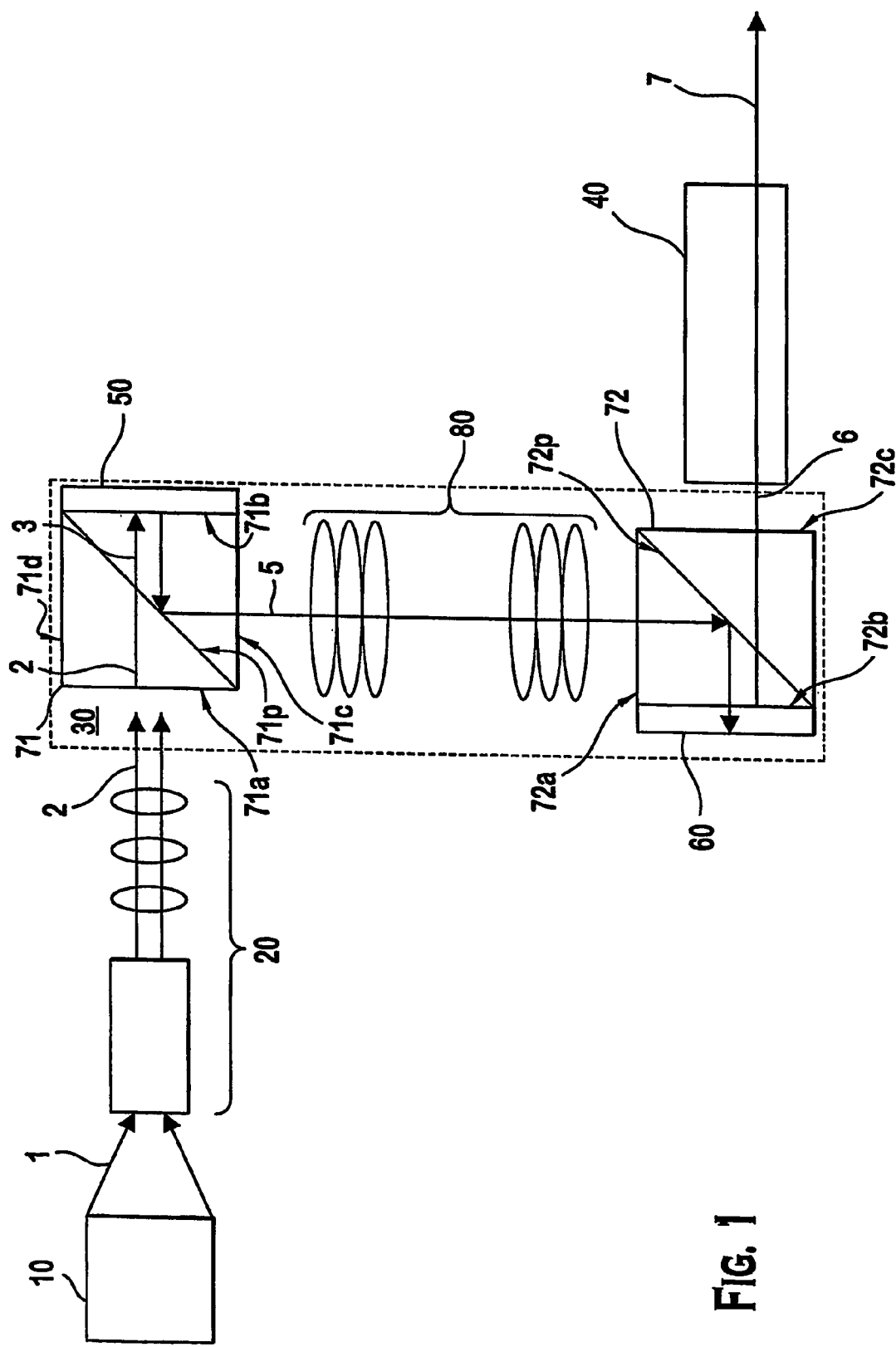
FIG. 1 shows a block diagram of an LCOS projection system with a two-stage projection architecture according to an exemplary embodiment of the present invention.

The present invention provides a projection system, such as for a television display, with enhanced contrast ratio and reduced contouring. In an exemplary LCOS-to-LCOS projection system, illustrated in FIG. 1, white light 1 is generated by a lamp 10. Lamp 10 may be any lamp suitable for use in an LCOS system. For example a short-arc mercury lamp may be used. The white light 1 enters an integrator 20, which directs a telecentric beam of white light 1 toward the projection system 30. The white light 1 is then separated into its component red, green, and blue (RGB) bands of light 2. The RGB light 2 may be separated by dichroic mirrors (not shown) and directed into separate red, green, and blue projection systems 30 for modulation. The modulated RGB light 2 is then recombined by a prism assembly (not shown) and projected by a projection lens assembly 40 onto a display screen (not shown).

Alternatively, the white light 1 may be separated into RGB bands of light 2 in the time domain, for example, by a color wheel (not shown), and thus directed one-at-a-time into a single LCOS-to-LCOS projection system 30.

An exemplary LCOS-to LCOS projection system 30 uses a two-stage projection architecture according to the present invention. The monochromatic RGB bands of light 2 are sequentially modulated by two different imagers 50, 60 on a pixel-by-pixel basis. The RGB bands of light 2 comprise a p-polarized component 3 and an s-polarized component 4 (not shown). These RGB bands of light 2 enter a first surface 71a of a first PBS 71 and are polarized by a polarizing surface 71p within the first PBS 71. The polarizing surface 71p allows the P-polarized component 3 of the RGB bands of light 2 to pass through the first PBS 71 to a second surface 71b, while reflecting the s-polarized component at an angle, away from the projection path where it passes out of first PBS 71 through fourth surface 71d. A first imager 50 is disposed beyond the second surface 71b of the first PBS 71 opposite the first face 71a, where the RGB bands of light enter first PBS 71. The p-polarized component 3, which passes through the PBS 71, is therefore incident on the first imager 50.

In the exemplary embodiment, illustrated in FIG. 1, first imager 50 is a LCOS imager comprising a matrix of polarized liquid crystals corresponding to the pixels of the display image (not shown). These crystals transmit light according to their orientation, which in turn varies with the strength of an electric field created by a signal provided to the first imager 50. The imager pixels modulate the p-polarized light 3 on a pixel-by-pixel basis proportional to a gray scale value provided to the first imager 50 for each individual pixel. As a result of the modulation of individual pixels, the first imager 50 provides a first light matrix 5, comprising a matrix of pixels or discreet dots of light. First light matrix 5 is an output of modulated s-polarized light reflected from the first imager 50 back through second surface 71b of first PBS 71, where it is reflected by a polarizing surface 71p at an angle out of the first PBS 71 through a third surface 71c. Each pixel of the first light matrix 5 has an intensity or luminance proportional to the individual gray scale value provided for that pixel in first imager 50.

The first light matrix 5 of s-polarized light is reflected by the PBS 71 through a relay lens system 80, which provides 1-to-1 transmission of the first light matrix 5. In an exemplary embodiment, illustrated in FIG. 2, relay lens system 80 comprises a single-gauss lens set and a mirror 83 to reflect the image back through the lens set. This single-gauss lens set comprises a spherical lens 81 and an acromatic lens 82 configured to provide low distortion of the image being transmitted with a magnification of about −1, so that the output of each pixel in the first imager 50 is projected onto a corresponding pixel of the second imager 60.

Figure 2:
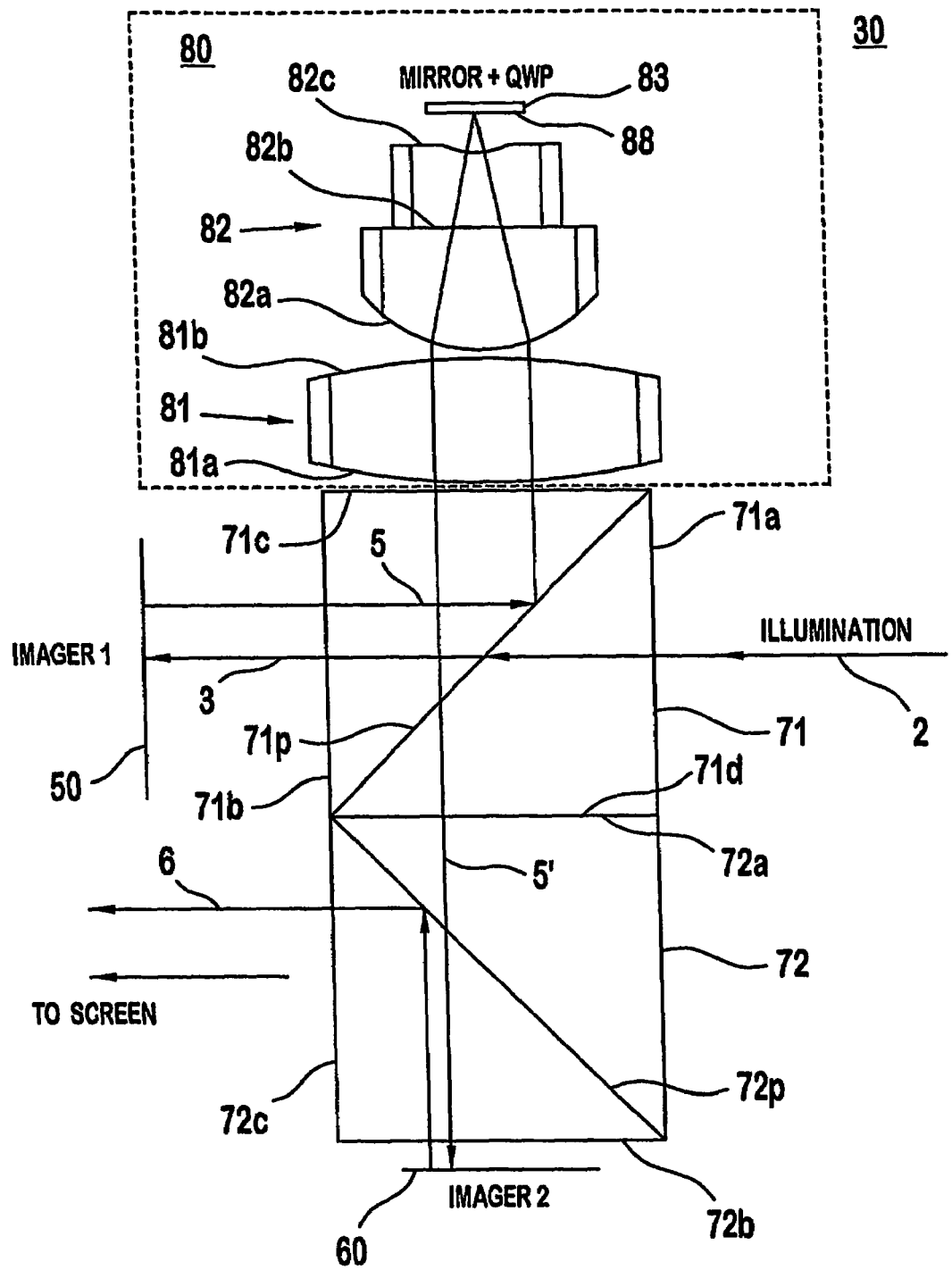
FIG. 2 shows an exemplary two-stage projection system according to the present invention.

As shown in FIG. 2, exemplary relay lens system 80 comprises a mirror 83 positioned at the focal point or system stop for the lens system 80, a spherical lens 81 positioned between the first PBS 71 and the mirror 83, and an acromatic lens 82 between the spherical lens 81 and the mirror 83. The inventors have determined that the projection path of the projection system 30 can be folded such that an image passes through lenses 81, 82, is reflected by the mirror 83, and passes back through lenses 81, 82 in the opposite order. To relay an image through a folded projection path with low distortion and a high optical transfer function modulus, the inventors have determined that an equivalent lens system must be developed that is symmetrical about the system stop.

Figure 3:
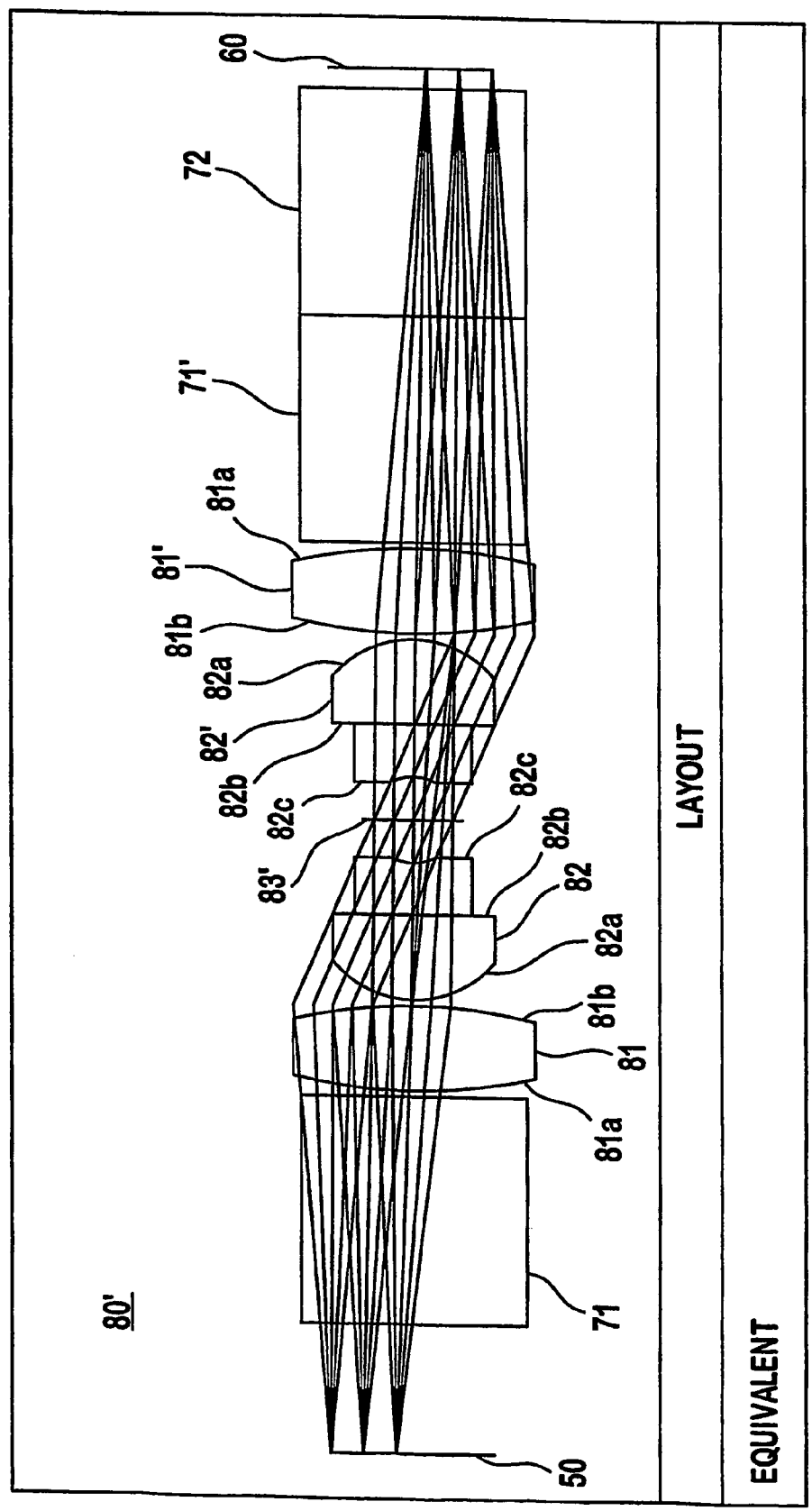
FIG. 3 shows an equivalent projection system for the projection system of FIG. 2 with an unfolded symmetrical lens system.

An equivalent lens system 80' is shown in FIG. 3. The equivalent lens system 80' comprises the spherical lens 81 and the acromatic lens 82 of the single-gauss lens set described above, with a system stop 83' with no mirror. Between the system stop 83' and the second imager 72, equivalent lens system 80' comprises an equivalent acromatic lens 82' and an equivalent spherical lens 81'. Equivalent acromatic lens 82' and equivalent spherical lens 81' are actually the acromatic lens 82 and the spherical lens 81, respectively with the image passing through them in the opposite direction. Spherical lens 81 has a first surface 81a and second surface 81b which bend the diverging light pattern from the first PBS 71 into a light pattern converging toward the optical axis of the equivalent lens system 80'. The acromatic lens 82 has a first surface 82a, a second surface 82b, and a third surface 82c, which focus the converging light pattern from the spherical lens 81 onto the system stop 83'. At the system stop 83', the light pattern inverts and diverges. The equivalent acromatic lens 82', which has a first surface 82c, a second surface 82b, and a third surface 82a, is the reverse of the acromatic lens 82 (i.e., the same lens turned backward such that first surface 82c of equivalent acromatic lens 82' is the third surface 82c of the acromatic lens 82 and third surface 82a of equivalent acromatic lens 82' is the first surface 82a of the acromatic lens 82). The surfaces 82c, 82b, and 82a of equivalent acromatic lens 82' distribute the diverging light pattern onto the equivalent spherical lens 81'. The equivalent spherical lens 81', which has a first surface 81b and a second surface 81a, is the reverse of the spherical lens 81. Surfaces 81b and 81a bend the light pattern to converge to form an inverted image on the second imager 60 that has a one-to-one correspondence to the object or matrix of pixels from the first imager 50. The surfaces of equivalent relay lens system 80' are configured to work with the imagers 50, 60 and PBS's 71, 72 to achieve the one-to-one correspondence of the pixels of first imager 50 and second imager 60. A summary of the surfaces of an exemplary projection system 30 using equivalent relay lens system 80' is provided in Table 1. These exemplary lens surfaces were developed by the inventors using ZEMAX™ software and novel characteristics determined by the inventors. Various modifications can be made to this exemplary projection system based on such factors as: cost, size, luminance levels, and other design factors.

TABLE 1

(dimensions in mm)

| device | surface | type | radius | thickness | glass | diameter | conic |
|---|---|---|---|---|---|---|---|
| 50 | object | std | infinity | 19.82429 | | 20.4 | 0 |
| 71 | 2nd (71b) | std | infinity | 28 | SF2 | 26.74929 | 0 |
| 71 | 3rd (71c) | std | infinity | 1.457079 | | 32.16696 | 0 |
| 81 | 1st (81a) | std | 47.25938 | 12.01184 | BAK2 | 33.58872 | −1.021197 |
| 81 | 2nd (81b) | std | −29.12938 | 0.9996844 | | 33.36579 | −2.209548 |
| 82 | 1st (82a) | std | 16.44959 | 10.00551 | BAK2 | 25.54432 | 0 |
| 82 | 2nd (82b) | std | 121.3619 | 7.005045 | SF15 | 20.37508 | 0 |
| 82 | 3rd (82c) | std | 10.52292 | 5.510076 | | 11.49384 | 0 |

TABLE 1-continued (dimensions in mm)

| device | surface | type | radius | thickness | glass | diameter | conic |
|---|---|---|---|---|---|---|---|
| 83' | stop (83') | std | infinity | 5.510076 | | 9.737583 | 0 |
| 82' | 1st (82c) | std | −10.52292 | 7.005045 | SF15 | 12.92177 | 0 |
| 82' | 2nd (82b) | std | −121.3619 | 10.00551 | BAK2 | 23.27955 | 0 |
| 82' | 3rd (82a) | std | −16.44959 | 0.9996844 | | 27.50165 | 0 |
| 81' | 1st (81b) | std | 29.12938 | 12.01184 | BAK2 | 37.49786 | −2.209548 |
| 81' | 2nd (81a) | std | −47.25938 | 1.457079 | | 37.57717 | −1.021197 |
| 71' | 1st (71b) | std | infinity | 28 | SF2 | 35.41905 | 0 |
| 71' | 2nd (71a) | std | infinity | 0.01 | | 28.50347 | 0 |
| 72 | 1st (72a) | std | infinity | 28 | SF2 | 28.49931 | 0 |
| 72 | 2nd (72b) | std | infinity | 2.946528 | | 21.58373 | 0 |
| 60 | image | std | infinity | | | 20.41337 | 0 |

The first light matrix 5, as explained above comprises modulated s-polarized light. In order to pass through the first PBS 71 after being reflected by the mirror 83, the first light matrix 5 must be inverted to an inverted first light matrix 5'. This may be done, for example, by placing a Quarter Wave Plate (QWP) 88 between the lenses 81, 82 and the mirror 83. In an exemplary embodiment the QWP 88 is a broadband QWP laminated on the mirror 83. As the projection path passes through QWP 88 twice, first light matrix 5 is inverted to inverted first light matrix 5'. After the inverted first light matrix 5' leaves the equivalent relay lens system 80', it passes back through the first PBS 71 from surface 71c to surface 71d and enters into a second PBS 72 through a first surface 72a and out through surface 72b onto a second imager 60. In the exemplary embodiment, illustrated in FIG. 2, second imager 60 is an LCOS imager which modulates the previously modulated and inverted first light matrix 5' on a pixel-by-pixel basis proportional to a gray scale value provided to the second imager 60 for each individual pixel. The pixels of the second imager 60 correspond on a one-for-one basis with the pixels of the first imager 50 and with the pixels of the display image. Thus, the input of a particular pixel (i,j) to the second imager 60 is the output from corresponding pixel (i,j) of the first imager 50.

The second imager 60 then produces an output matrix 6 of p-polarized light. Each pixel of light in the output matrix 6 is modulated in intensity by a gray scale value provided to the imager for that pixel of the second imager 60. Thus a specific pixel of the output matrix 6 (i,j) would have an intensity proportional to both the gray scale value for its corresponding pixel $(i,j)_1$ in the first imager and its corresponding pixel $(i,j)_2$ in the second imager 60.

The light output L of a particular pixel (i,j) is given by the product of the light incident on the given pixel of first imager 50, the gray scale value selected for the given pixel at first imager 50, and the gray scale value selected at second imager 60:

$$L = L0 \times G1 \times G2$$

L0 is a constant for a given pixel (being a function of the lamp 10, and the illumination system.) Thus, the light output L is actually determined primarily by the gray scale values selected for this pixel on each imager 50, 60. For example, normalizing the gray scales to 1 maximum and assuming each imager has a very modest contrast ratio of 200:1, then the bright state of a pixel (i,j) is 1, and the dark state of pixel (i,j) is 1/200 (not zero, because of leakage). Thus, the two stage projector architecture has a luminance range of 40,000:1.

$$L\max = 1 \times 1 = 1;$$

$$L\min = 0.005 \times 0.005 = 0.000025$$

The luminance range defined by these limits gives a contrast ratio of 1/0.000025:1, or 40,000:1. Importantly, the dark state luminance for the exemplary two-stage projector architecture would be only a forty-thousandth of the luminance of the bright state, rather than one two-hundredth of the bright state if the hypothetical imager were used in an existing single imager architecture. As will be understood by those skilled in the art, an imager with a lower contrast ratio can be provided for a considerably lower cost than an imager with a higher contrast ratio. Thus, a two-stage projection system using two imagers with a contrast ratio of 200:1 will provide a contrast ratio of 40,000:1, while a single-stage projection system using a much more expensive imager with a 500:1 ratio will only provide a 500:1 contrast. Also, a two-stage projection system with one imager having a 500:1 contrast ratio and an inexpensive imager with a 200:1 ratio will have a system contrast ratio of 100,000:1. Accordingly, a cost/performance trade-off can be performed to create an optimum projection system.

Referring again to FIG. 2, the output matrix 6 enters the second PBS 72 through second surface 72b. Second PBS 72 has a polarizing surface 72p that reflects the s-polarized output matrix 6 through a third surface 72c. After output matrix 6 leaves the second PBS 72, it enters the projection lens assembly 40, which projects a display image 7 onto a screen (not shown) for viewing.

Figure 4:
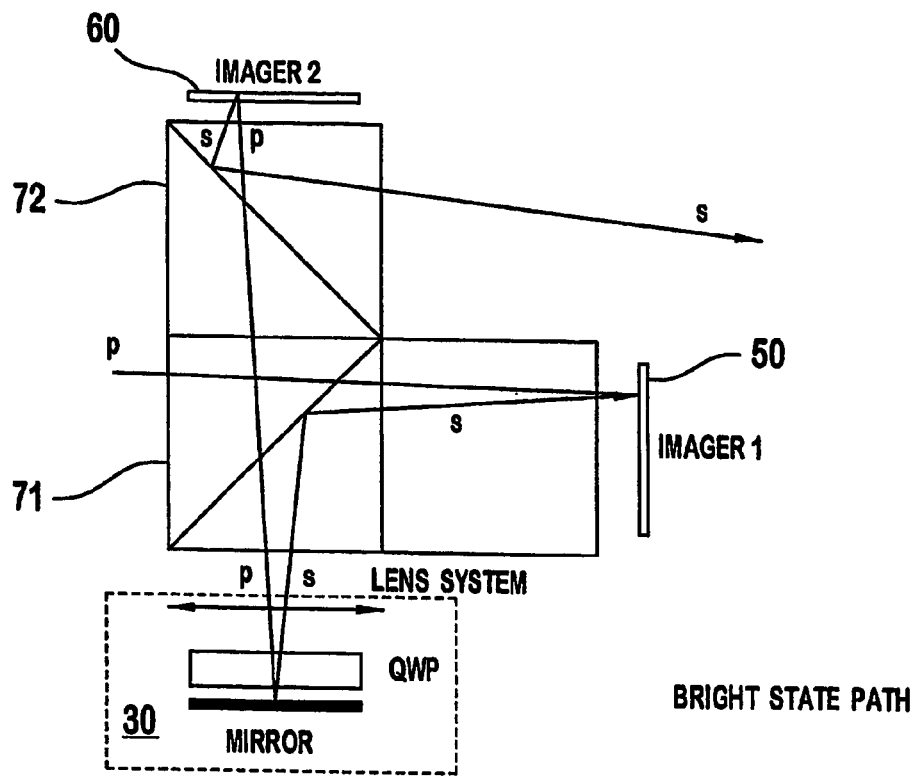
FIG. 4 shows the bright state light path for an exemplary, simplified two-stage projection architecture according to the present invention.
Figure 5:
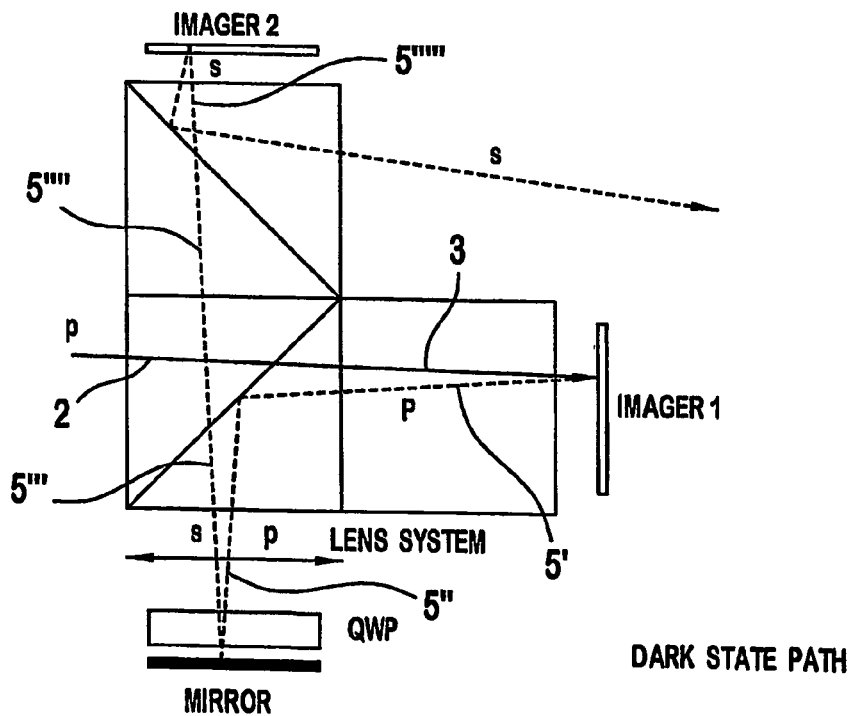
FIG. 5 shows light leakage in the dark state for an exemplary, simplified two-stage projection architecture according to the present invention.

The bright state projection path and leakage path are shown in FIGS. 4 and 5 respectively. Referring first to FIG. 4, the polarizing beam splitters (PBS) 71, 72 pass p-polarized light straight through and deflect s-polarized light. When a pixel of the first imager 50 is set to the bright state, it inverts the incident p-polarized light to s-polarized light and reflects this s-polarized light. The first PBS 71 then deflects the s-polarized light toward the two-stage projection system 30, which includes lenses, a quarter wave plate, and a mirror. Because the light passes through the quarter wave plate twice, it is inverted a half wave to p-polarized light, which passes through both PBS's 71, 72 onto the second imager 60. The second imager 60 inverts and reflects the light as s-polarized light, which is deflected by the second PBS 72 toward the projection lens system (not shown).

Referring to FIG. 5, when a pixel of the first imager is set to the dark state, most of the p-polarized light is not transmitted and reflected by the first imager 50. A small portion of light leaks through the imager 50 as p-polarized first leakage 5'. Most of this p-polarized first leakage 5' passes through the first PBS 71. However a small second leakage 5" is deflected onto the projection system 30, where it is inverted to s-polarized light second leakage 5'". Most of the s-polarized second leakage 5'" is deflected by the first PBS 71, but a small portion passes through the first PBS 71 as third leakage 5"". The second PBS 72 deflects most of third leakage 5"", but a small portion passes through the second PBS 72 and onto the second imager 60 as s-polarized fourth leakage 5""'. Second imager 60 reflects the s-polarized fourth leakage 5""' without inverting it, because it is s-polarized light, and the second PBS 72 deflects the s-polarized light toward the projection lens system (not shown). Thus, in the dark state, light must leak through the first imager once, the first PBS twice, and the second PBS once, in order to reach the projection lens system. If the first imager 50 and PBS's 71, 72 each have a leakage of 0.05, for example, the net leakage would be $0.05^4$ or 6.25EE-06.

Figure 6:
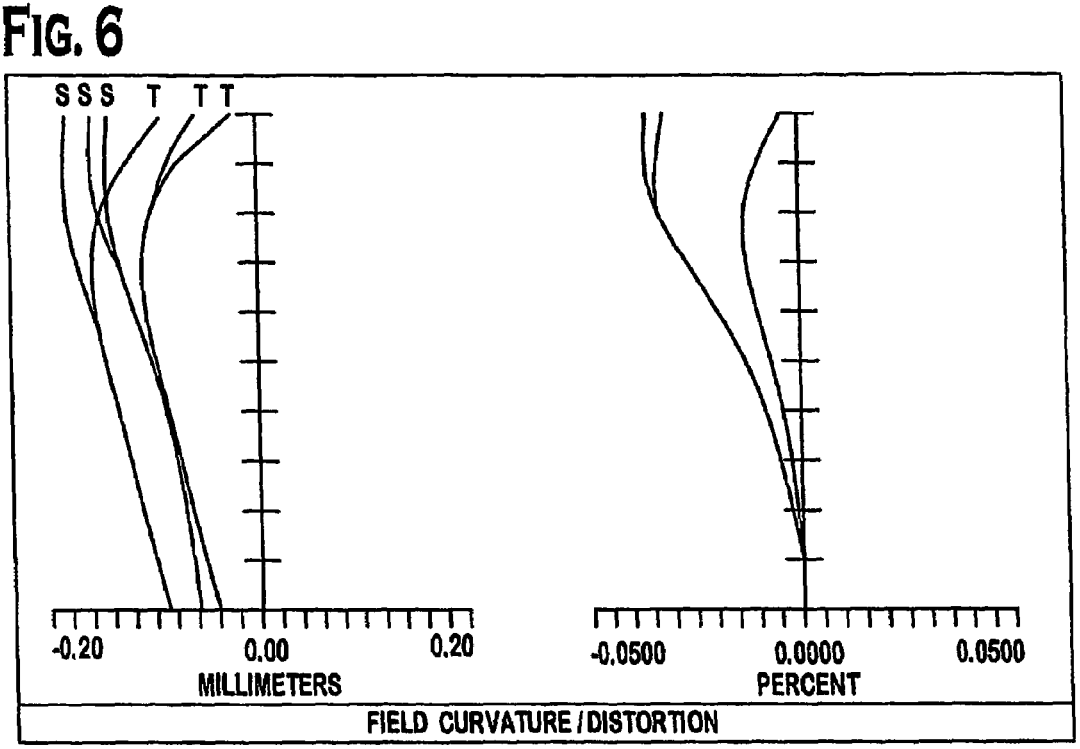
FIG. 6 shows the field curvature distortion for an exemplary, simplified two-stage projection architecture according to the present invention.
Figure 7:
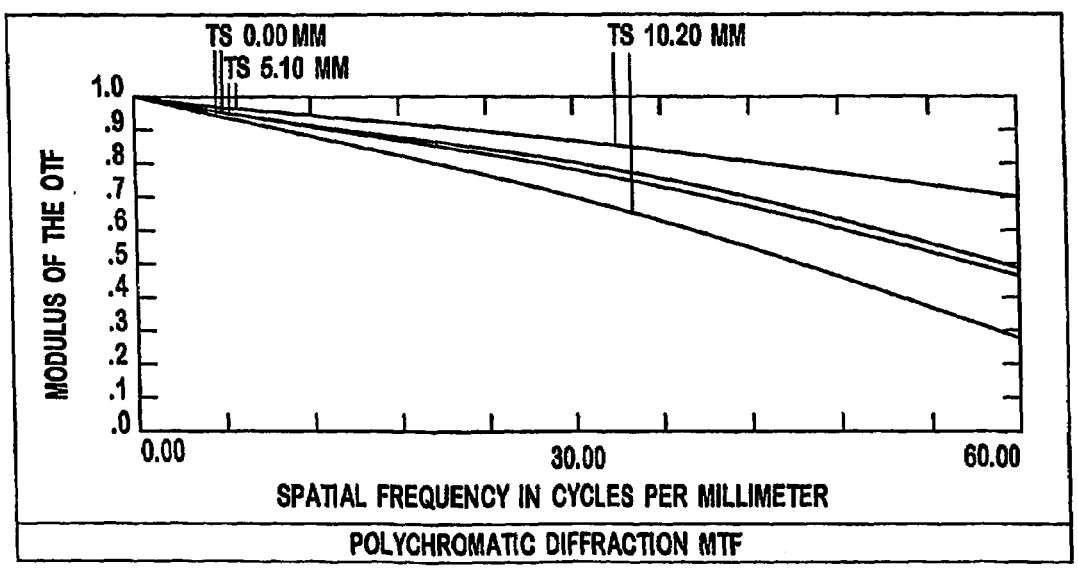
FIG. 7 shows the modulus transfer function for an exemplary, simplified two-stage projection architecture according to the present invention.

As described above, the lens system 80 summarized in Table 1 was designed using the ZEMAX™ software package under system constraints devised by the inventors. The distortion and the modulation transfer function calculated by the ZEMAX™ software package for this exemplary lens system are shown in FIGS. 6 and 7, respectively. The distortion is less than 0.05%, as shown in FIG. 6, and the optical trnasfer function at a spatial frequency of 36 cycles per millimeter is greater than 0.6, as shown in FIG. 7.

Referring again to Table 1, the thickness provided for each surface is the distance to the next surface in the projection system. Accordingly, the total distance between the first PBS 71 and the mirror is less than 37 millimeters, and the length of the projection system along its greatest dimension is less than 100 millimeters, providing a very compact projection system.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A projection system for projecting an image comprising a matrix of pixels having modulated luminance, the projection system comprising:
    a first imager configured to modulate a light band on a pixel-by-pixel basis proportional to gray scale values provided for each pixel of the image to provide a first output matrix;
    a second imager positioned and configured to receive the first output matrix of modulated pixels of light and modulate the individual modulated pixels of light from the first imager on a pixel-by-pixel basis proportional to a second gray scale value provided for each pixel of the image; and
    a relay lens system configured to focus the modulated light output from the first imager on a pixel-by-pixel basis onto the corresponding pixels of the second imager, the relay lens system including a single-gauss lens set and a mirror positioned at the system stop for the lens set to reflect the image back through the lens set.

2. The projection system of claim 1 wherein the relay lens system further comprises a quarter-wave plate disposed between the single-gauss lens set and the mirror.

3. The projection system of claim 2 further comprising first and second polarizing beam splitters disposed between the mirror and the second imager.

4. The projection system of claim 3 wherein the first polarizing beam splitter is also disposed between an illumination source and the first imager.

5. The projection system of claim 1 wherein the single-gauss lens set comprises a single spherical lens and an acromatic lens, wherein the acromatic lens is disposed between the single spherical lens and the system stop.

6. The projection system of claim 1 wherein the relay lens system has a distortion of less than about 0.05% with an optical transfer function of greater than 0.6 at a spatial frequency of 36 cycles per millimeter.

7. The projection system of claim 1 wherein the relay lens system has a magnification of between about −0.9995 and −1.0005.

8. The projection system of claim 1 wherein the relay lens system has a telecentricity with an input and output angle deviation of less than 1.05 degrees.

9. A two-stage projection system for projecting an image along a projection path, the projection system comprising:
    first and second imagers, each comprising a matrix of pixels, with a mirror disposed in the projection path between the imagers and a single-gauss lens set having an optical axis on the projection path and disposed between the mirror and the imagers, such that the output of a first imager passes through the single-gauss lens set once in each direction along the optical axis of the single-gauss lens set focusing the output of a specific pixel of the first imager onto a corresponding pixel on the second imager.

10. The two-stage projection system of claim 9 wherein the first and second imagers are LCOS imagers and first and second polarizing beam splitters are disposed between the mirror and the second imager.

11. The two-stage projection system of claim 10 wherein the first polarizing beam splitter is simultaneously disposed between an illumination source and the first imager.

12. The two-stage projection system of claim 11 further comprising a quarter-wave plate disposed between the single-gauss lens set and the mirror.

13. The two-stage projection system of claim 9 wherein the single-gauss lens set comprises a single spherical lens and an acromatic lens, wherein the acromatic lens is disposed between the single spherical lens and the system stop.

14. The two-stage projection system of claim 9 wherein the single-gauss lens set has a distortion of less than about 0.05% with an optical transfer function of greater than 0.6 at a spatial frequency of 36 cycles per millimeter.

15. The two-stage projection system of claim 9 wherein the single-gauss lens set has a magnification of between about −0.9995 and −1.0005.

16. The two-stage projection system of claim 9 wherein the single-gauss lens set is telecentric with an input and output angle deviation of less than 1.05 degrees.

17. The two-stage projection system of claim 9 where the length of the projection system along its greatest dimension is less than 100 millimeters.

* * * * *